(12) United States Patent
Rudelic et al.

(10) Patent No.: US 9,448,938 B2
(45) Date of Patent: Sep. 20, 2016

(54) CACHE COHERENCE PROTOCOL FOR PERSISTENT MEMORIES

(75) Inventors: John Rudelic, Folsom, CA (US); August Camber, Rocklin, CA (US); Mostafa Naguib Abdulla, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 673 days.

(21) Appl. No.: 12/797,522

(22) Filed: Jun. 9, 2010

(65) Prior Publication Data
US 2011/0307653 A1 Dec. 15, 2011

(51) Int. Cl.
*G06F 12/08* (2016.01)

(52) U.S. Cl.
CPC ................... *G06F 12/0831* (2013.01)

(58) Field of Classification Search
CPC ............. G06F 12/084; G06F 12/0844
USPC ................... 711/141, 103, 154; 707/999.201
See application file for complete search history.

(56) References Cited

U.S. PATENT DOCUMENTS

| | | | |
|---|---|---|---|
| 5,442,704 A | 8/1995 | Holtey | |
| 5,778,429 A | 7/1998 | Sukegawa et al. | |
| 6,003,142 A | 12/1999 | Mori | |
| 6,658,539 B2 * | 12/2003 | Arimilli et al. | 711/141 |
| 8,055,847 B2 | 11/2011 | Cantin, Jr. | |
| 8,180,981 B2 * | 5/2012 | Kapil et al. | 711/159 |
| 2003/0005237 A1 | 1/2003 | Dhong et al. | |
| 2004/0158742 A1 | 8/2004 | Srinivasan et al. | |
| 2004/0242029 A1 | 12/2004 | Nakamura et al. | |
| 2005/0160229 A1 | 7/2005 | Johns et al. | |
| 2005/0166020 A1 | 7/2005 | Jamil et al. | |
| 2005/0251617 A1 * | 11/2005 | Sinclair | G06F 3/061 711/103 |
| 2006/0026569 A1 | 2/2006 | Oerting et al. | |
| 2006/0156064 A1 | 7/2006 | Damani et al. | |
| 2006/0242378 A1 * | 10/2006 | Kano | G06F 3/0608 711/170 |
| 2006/0265544 A1 | 11/2006 | Rudelic | |
| 2007/0113044 A1 | 5/2007 | Day et al. | |
| 2007/0226795 A1 | 9/2007 | Conti et al. | |
| 2008/0082766 A1 * | 4/2008 | Okin et al. | 711/154 |
| 2008/0320224 A1 | 12/2008 | Kiyota | |

(Continued)

FOREIGN PATENT DOCUMENTS

| | | |
|---|---|---|
| CN | 1504902 A | 6/2004 |
| CN | 1864140 A | 11/2006 |
| CN | 101131624 | 2/2008 |
| JP | H03-58163 | 3/1991 |

(Continued)

OTHER PUBLICATIONS

U.S. Appl. No. 12/797,512, Jun. 9, 2010.

(Continued)

*Primary Examiner* — Gary W Cygiel
(74) *Attorney, Agent, or Firm* — Brooks, Cameron & Huebsch, PLLC

(57) ABSTRACT

A memory device having a memory controller, a main memory with at least a portion comprising persistent memory, and at least two processing entities, wherein the memory controller enables the processing entities to access the main memory according to a cache coherence protocol. The cache coherency protocol can signal when the main memory is being updated and when the update has finished. The processing entities can be configured to wait for the main memory to be updated or can access previously stored memory.

15 Claims, 4 Drawing Sheets

(56) References Cited

U.S. PATENT DOCUMENTS

| | | |
|---|---|---|
| 2009/0037666 A1 | 2/2009 | Rahman et al. |
| 2009/0158000 A1 | 6/2009 | Takahashi |
| 2010/0058046 A1 | 3/2010 | John et al. |
| 2010/0064111 A1 | 3/2010 | Kunimatsu et al. |
| 2010/0211742 A1 | 8/2010 | Turullols et al. |
| 2010/0293317 A1 | 11/2010 | Confalonieri et al. |
| 2011/0093646 A1* | 4/2011 | Koka et al. .................. 711/103 |
| 2011/0307665 A1 | 12/2011 | Rudelic et al. |

FOREIGN PATENT DOCUMENTS

| | | |
|---|---|---|
| JP | 6-150031 | 5/1994 |
| JP | H08-16470 | 1/1996 |
| JP | 8-95861 | 12/1996 |
| JP | 10-161930 | 6/1998 |
| JP | 2004-334996 | 11/2004 |
| JP | 2006 323739 | 11/2006 |
| JP | 2009-295156 | 12/2009 |
| KR | 10-2002-0097145 | 12/2002 |
| KR | 10-2010-0053540 | 5/2010 |
| TW | 200622905 | 7/2006 |
| TW | 200710722 | 3/2007 |
| TW | 201017408 | 5/2010 |
| TW | 201017421 | 5/2010 |
| WO | WO 01/50269 | 7/2001 |
| WO | WO 2006/107095 | 10/2006 |
| WO | WO 2007/105256 | 9/2007 |
| WO | WO 2009/017890 A2 | 2/2009 |

OTHER PUBLICATIONS

INTEL / "An Introduction to the Intel QuickPath Interconnect" Jan. 2009, pp. 1-22, Document No. 320412-001US, Intel Corporation.

Korean Office Action dated Apr. 15, 2013 of corresponding Korean Patent Application 10-2010-0053540.

German Office Action dated Mar. 28, 2013 of corresponding German Patent Application DE 102011076895.5.

Japan Office Action dated Mar. 4, 2013 of corresponding Japanese Patent Application 2011-114340.

Lee, B.C. et al.: Phase-Change Technology and the Future of Main Memory, in: IEEE Micro Jan./Feb. 2010, pp. 131 to 141.

Patterson, D.A. et al.: Computer Architecture a Quantitative Approach, $2^{nd}$ Ed., Morgan Kaufmann Publishers, Inc. 1996, pp. 654 to 693.

Taiwanese Office Action dated Dec. 2, 2013 of corresponding Taiwanese Patent Application No. 100120245—8 pages.

Chinese Office Action dated Aug. 22, 2013 of corresponding Chinese Patent Application No. 201110159791.9—8 pages.

Korean Office Action dated Nov. 19, 2013 of corresponding Korean Patent Application 10-2010-0053540.

Chinese Office Action dated Feb. 11, 2015 of corresponding Chinese Patent Application No. 201110159791.9.

Chinese Office Action dated Aug. 11, 2014 of corresponding Chinese Patent Application No. 201110159791.9.

Chinese Office Action dated Mar. 5, 2014 of corresponding Chinese Patent Application No. 201110159791.9.

Desikan, R., "On-chip MRAM as High-Bandwidth, Low-Latency Replacement for DRAM Physical Memories," Nov. 27, 2002, Department of Computer Sciences, University of Texas Austin.

Sinharoy, B. et al., "POWER5 System Microarchitecture," IBM Journal of Research and Development—POWER 5 and packing. vol. 49, Jul. 2005, p. 505-521.

Wu, X. et al., "Hybrid Cache Architecture with Disparate Memory Technologies," ISCA 2009 Proceedings of the $36^{th}$ Annual International Symposium on Computer Architecture, p. 34-45.

* cited by examiner

CACHE COHERENCE PROTOCOL FOR PERSISTENT MEMORIES

BACKGROUND

1. Field

Subject matter disclosed herein relates to cache coherence of a processor system that includes persistent memory.

2. Information

Computer systems may utilize a shared memory multi-processor (SMP) configuration. Increasing the number of processors in such a computer system sharing a same main memory may enhance performance of the system. A computer system may incorporate coherency protocol to assure coherency between information read from cache memory and information read from main memory. For example, if one processor has updated information stored in main memory, the change in the information may be reflected in copies stored in memory caches of other processors.

Computer systems may use any of a number of coherency protocols, such as the MESI protocol, for example, to perform coherency management. The MESI protocol may manage cache lines in a cache memory by assuming that the cache lines are in one of four states, namely "M" (Modified), "E" (Exclusive), "S" (Shared), and "I" (Invalid) states. In a computer system using the MESI protocol, individual processors may determine whether to issue a cache coherency management request for a particular cache line based, at least in part, on its MESI state.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
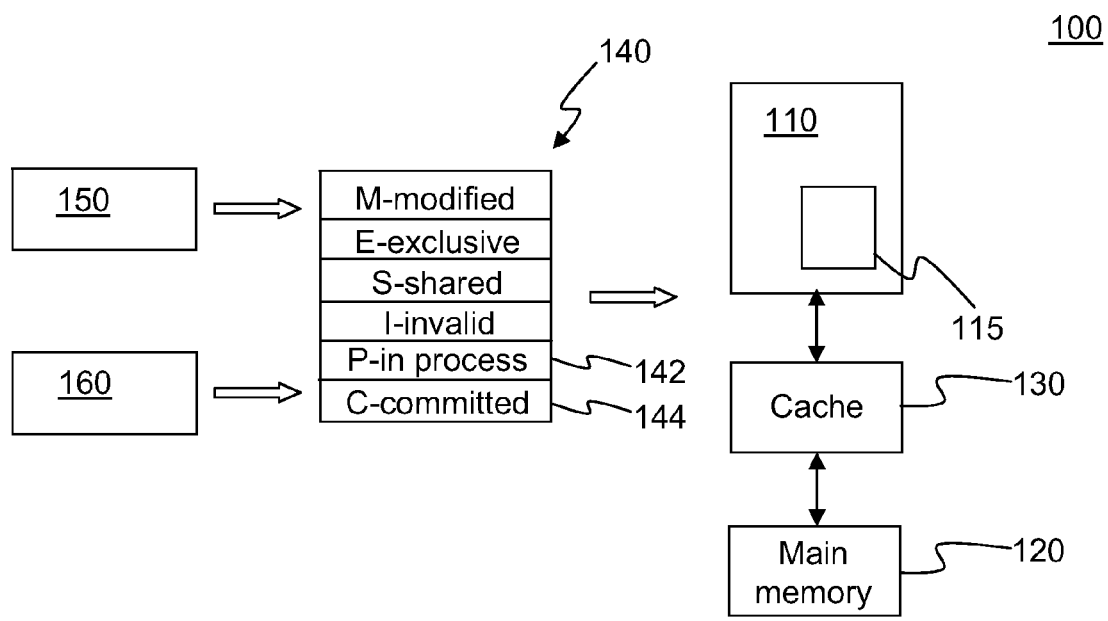
FIG. 1 is a schematic block diagram of a processing system configuration, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In an embodiment, a system of two or more processing entities, such as central processing units (CPUs), may include persistent memory. Cache coherency protocol for such a system may include one or more features to accommodate particular aspects of persistent, non-volatile memory. As described in detail below, such features may comprise one or more cache coherency protocol states that indicate whether a process to update a persistent memory is pending and/or whether such a process is complete. Another feature may comprise a persistent memory descriptor to indicate a range of memory that includes persistent memory. Accordingly, such a system of two or more processing entities may also comprise circuitry to provide at least a portion of cache coherency protocol, as described in detail below.

Such a system of two or more processing entities, for example, may comprise a computing system to execute applications in any of a number of environments, such as computers, cell phones, PDA's, data loggers, and navigational equipment, just to name a few examples. In particular, multiple applications may be executed simultaneously by multiple CPUs. In an implementation, one or more such CPUs may be individually associated with a main memory and/or cache memory, either of which at least a portion may comprise persistent memory. For example, a main memory and/or cache memory may comprise a portion of persistent memory and any of a variety of random access memories (RAM). In a particular example, main memory may include at least a portion of phase change memory (PCM) and dynamic random access memory (DRAM). In another particular example, cache memory may comprise PCM and/or DRAM. Such memory configurations may provide benefits such as non-volatility, relatively high program/read speeds, for example. Of course, such descriptions of memory are merely examples, and claimed subject matter is not limited in this respect.

Herein, persistent memory refers to nonvolatile memory such as PCM, which may have a bit alterable capability. Another feature of persistent memory includes non-symmetrical read/write speeds, wherein program speed may be slower than read speed for a given memory cell. A presence of persistent memory, having such features, in a multi-processor system may utilize particular cache coherence protocols, to allow one or more processing entities to share main memory, for example. Herein, main memory refers to memory that is used by a processing entity to maintain one or more applications that may be executed by the processing entity. Further, main memory may be directly or indirectly linked to a processing entity, using memory instructions to access the main memory. Main memory is different, for example, from memory accessible via an I/O interface that uses I/O operations to access such memory. In a further example of main memory, a CPU may be limited to an ability to manipulate (e.g., erase, write) data that is resident in a main memory. Here, the word "main" may be used to distinguish from external mass storage devices such as disk drive, for example. Of course, such descriptions of main memory are merely examples, and claimed subject matter is not so limited.

Embodiments described herein include augmentation of any of a number of known multi-processor cache coherence protocols, such as MESI, MOSI, and MOESI protocols, for example. In particular, such embodiments may include states of protocols listed above and one or more additional states, as described in detail below. Such embodiments may extend cache coherency semantics to include support for persistent memories, for example. A cache coherence protocol may establish semantics for ensuring cache coherence between multiple processors operating on unified memory, for example. Cache coherence semantics may prevent race conditions where two or more processors operating on a same memory may become unsynchronized. Cache coherence protocols may provide instructions to a processor to synchronize local caches with main memory. Cache coherence protocols may help to ensure that contents of processors' cache are up-to-date with contents of main memory, for example.

In an embodiment, PCM may be used as main memory for a computing platform. PCM comprises persistent memory having a bit alterable nature that is similar to DRAM, though DRAM is volatile. If PCM is used as main memory on a computing platform, PCM may include at least some of the same cache coherence issues that apply to DRAM. Accordingly, MESI, MOSI, and MOESI protocols, just to name a few examples, may adequately cover cache coherence for PCM if PCM is used to replace DRAM in an application. Though PCM may be similar to DRAM in bit alterable fashion, PCM may be different from DRAM in the sense that PCM comprises a persistent memory. DRAM may lose stored contents if power is removed, while PCM may maintain stored contents even if power is removed. Thus, in an implementation, cache coherency semantics may be added to support such a nonvolatile characteristic of PCM, if PCM comprises at least a portion of main memory. Of course, such features and details of an embodiment that includes PCM as a main memory are merely examples, and claimed subject matter is not so limited.

In an embodiment, additional states to augment cache coherence semantics may provide support for memory coherence at a relatively high level within a memory hierarchy, such as in-memory databases, for example. In the case of main memory comprising a relatively fast but volatile memory such as DRAM, stored information may eventually be copied to a relatively slow disk, tape or other slow persistent memory. However, if PCM is used as main memory, because of the persistent capability of PCM, an application need not flush or checkpoint stored information to another storage medium. There may, however, be a process to communicate to various application processes whether contents of PCM are in the process of being updated, and whether such an update has been completed. Accordingly, additional states to augment cache coherence semantics may support higher level coherence semantics at an application level. In a particular implementation, a so-called persistent memory descriptor may be used to indicate a range of main memory that supports persistence, as explained in detail below.

FIG. 1 is a schematic block diagram of a processing system 100, according to an embodiment. Processing system 100 may comprise processing entity 110, main memory 120, and/or cache 130. In particular, processing entity 110 may comprise a CPU to host one or more applications that are maintained in main memory 120. Though not shown in FIG. 1, processing system 100 may comprise additional processing entities, additional main memories, and/or additional caches. For example, processing entity 110, main memory 120, and/or cache 130 may collectively comprise building blocks for larger multiprocessor systems. In one implementation, processing system 100 may operate using a memory hierarchy that includes one or more levels of cache memory shared among said one or more processing entities. For example, cache memory may comprise first level cache and second level cache, either of which at least a portion may comprise persistent memory. A cache coherence protocol may be applied to processing system 100 for coherency management. For example, such a protocol may lead to avoidance of read/write process conflicts among two or more main memories 120 and/or one or more caches 130. Hardware block 150 and/or code block 160 may together or separately provide a cache coherence protocol. In a particular implementation, such a cache coherence protocol may comprise protocol 140, which may include a number of states such as modified, exclusive, shared, and invalid states (e.g., MESI), just to name a few examples. An in-process state 142 may be included in protocol 140 to accommodate persistent memory in processing system 100, as explained in detail below. Another state included in protocol 140 may comprise committed state 144, also described in detail below. Such states may be reflected by selectable flags such as set or reset bits, one or more memory cells storing particular state information, one or more signals transmitted on electrical lines, and/or other type of information to convey a particular state. Of course, any number of states may be included in protocol 140, and claimed subject matter is not limited to those described herein. In an implementation, hardware block 150 may comprise electronic circuitry to provide at least a portion of cache coherence protocol 140. Such electronic circuitry may comprise, for example, various configurations of logic gates. Code block 160 may comprise one or more applications to provide at least a portion of cache coherence protocol 140. Portions of code block 160 may be implemented by processing entity 110.

In an embodiment, in-process state 142 may be used to indicate to one or more memory controllers 115 in processing system 100 that a memory location in main memory 120 is in a process of being updated. Accordingly, an application with such a particular memory location mapped into cache 130 may choose to wait for such an update operation to complete. Alternatively, the application may ignore the update and use currently available out-of-date cache contents (e.g., prior to completion of updating contents). In a particular implementation, committed state 144 may be used to indicate to memory controllers 115 in processing system 100 that a memory update is complete and cache 130 may reload information. An example of an application that may choose to ignore an in-process state is a search engine, since slightly old information need not adversely affect search results. In contrast, an example of an application that may not choose to ignore an in-process state is a bank application, relying on most-recent information available upon completion of an update process. Accordingly, such an application may wait for completion of any update operation and may invalidate associated cache information to ensure that the application continues to have most recent memory values. Of course, such details of a processing system and cache coherence protocol are merely examples, and claimed subject matter is not so limited.

Figure 2:
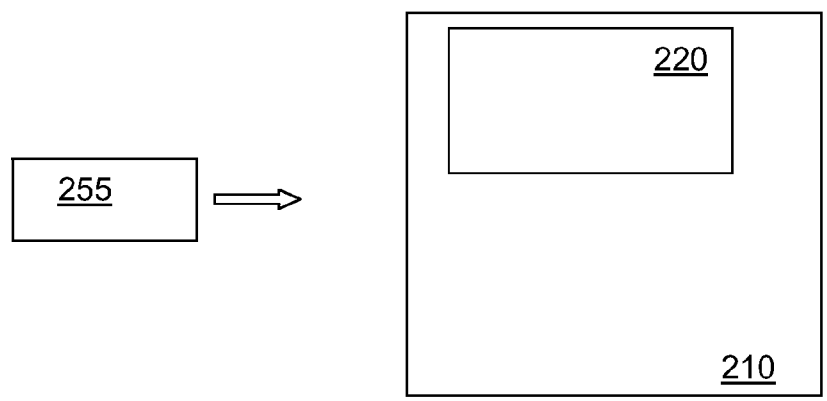
FIG. 2 is a schematic diagram of a main memory, according to an embodiment.
Figure 3:
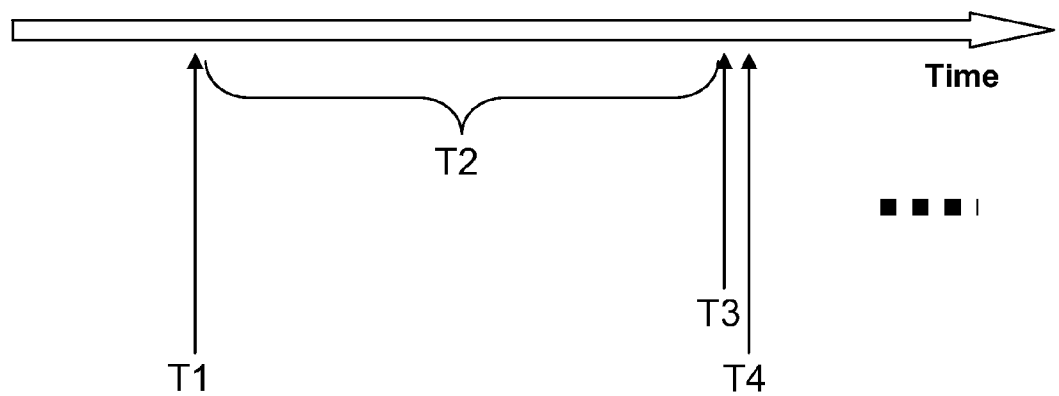
FIG. 3 is a timing diagram of a cache coherence protocol, according to an embodiment.

FIG. 2 is a schematic diagram of a main memory 210, according to an embodiment. At least a portion of main memory 210 may comprise persistent memory 220. In a particular implementation, another portion of main memory 210 may comprise various types of memory, such as volatile DRAM. Portions of persistent memory 220 need not be arranged contiguously in main memory 210, which may comprise one or more die structures, for example. Cache coherence protocol block 255 may comprise hardware and/or implemented code to provide a cache coherence protocol for a processing system (e.g., system 100 shown in FIG. 1) that includes main memory 210. In a particular implementation, such a cache coherence protocol may comprise in-process state 142 and/or committed state 144 to accommodate persistent memory 220, as described above. For example, in-process state 142 may accommodate added latency of a program operation compared to a read operation. Thus, in-process state 142 may indicate to an application whether the application is to wait for a relatively long cache program process. In another particular implementation, cache coherence protocol block 255 may provide a persistent memory descriptor to allow a computing platform to identify which portions of main memory 210 comprise persistent memory. For example, such identification may include one or more addresses or ranges of addresses of memory locations in main memory 210. Of course, claimed subject matter is not limited to such protocol states, and cache coherence protocol block 255 may provide any number of protocol states to a system FIG. 3 is a timing diagram of a cache coherence protocol, according to an embodiment. At time T1, an in-process state may be transitioned to indicate to a memory controller that at least one memory location in one or more main memories is in a process of being updated. During time span T2, one or more applications associated with the updating memory location(s) may choose to wait for such an update operation to complete. In another implementation, as described above, an application may ignore such an update operation and merely use currently available out-of-date cache contents. At time T3, an update operation may be completed, which may be indicated, for example, by a hardware signal transitioned from one state to another state, such as from high to low or from low to high. Subsequent to a completed update operation, at time T4, a committed state may be transitioned to indicate to a memory controller that a memory update is complete and cache memory may be available to reload information. Of course, such timing details of a cache coherence protocol are merely examples, and claimed subject matter is not so limited.

Figure 4:
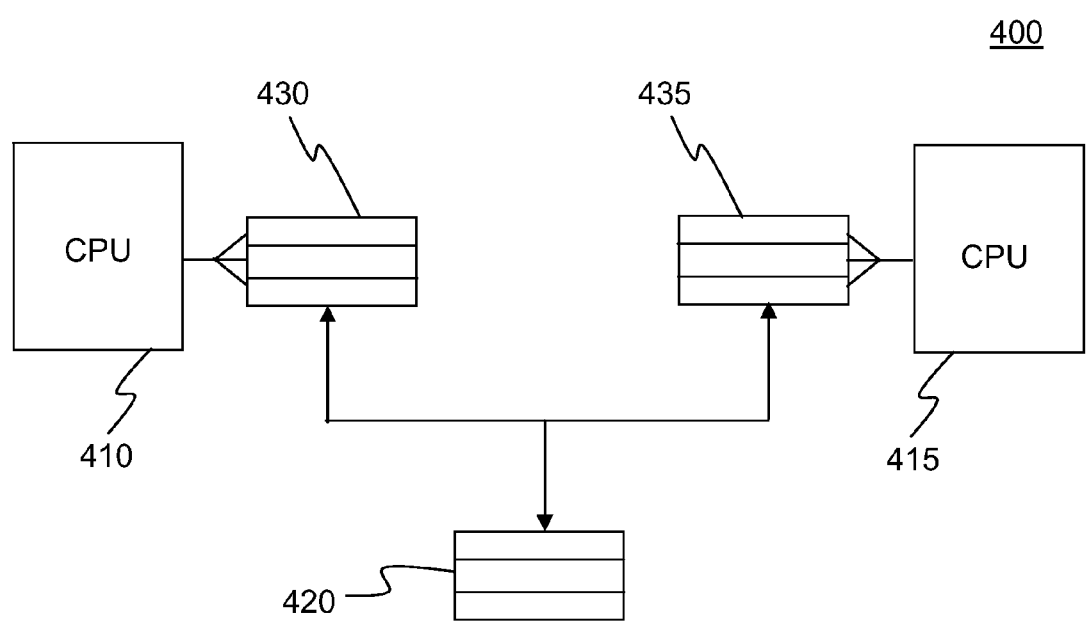
FIG. 4 is a schematic diagram of a multi-processor system configuration, according to an embodiment.

FIG. 4 is a schematic diagram of a multi-processor system configuration 400, according to an embodiment. A multi-processor system may include any number of processing entities, though two such entities are shown in FIG. 4. In particular, such processing entities may comprise CPU 410 associated with a cache 430 and CPU 415 associated with a cache 435. In an example, CPU 410 may have a cache line that points to a location in main memory 420. CPU 415 may have a cache line that points to the same location in main memory 420. Both CPU 410 and CPU 415 may write or read to/from the main memory location. A conflict may occur if CPU 415 attempts to read from a cache line while CPU 410 is writing to the main memory location. In one implementation, CPU 415 may not care about such a potential conflict. In another implementation, to avoid such a conflict CPU 415 may monitor in-process and/or committed states to ensure that an in-process write from CPU 410 has completed. In an implementation, in-process state may correspond to a particular bit, flag, or signal herein called an P-bit, and committed state may correspond to a particular bit, flag, or signal herein called a C-bit. Such bits may transition among set and reset states to indicate status of a process to update a main memory, as described above. In a particular implementation, CPU 415 may read from the cache line if neither the C nor P-bit are set. For example, if the P-bit is set, then CPU 410 may be updating main memory and CPU 415 may wait for the update to complete. Upon completion of the update of CPU 410, the C-bit may transition to indicate such completion. Accordingly, CPU 415 may reload the cache line in response to CPU 410 transitioning the C-bit. CPU 415 may then contain the latest up-to-date value for the memory location.

In an embodiment, coherence of main memory, of which at least a portion comprises persistent memory, may be maintained by an operating system virtual memory and/or by a default page handler. Such an operating system may support a method to identify a bulk write operation that involves coherence management. Such a bulk write operation may comprise a database write operation, for example. Applications may be coordinated among one another so that a bulk write operation may be managed as an atomic write operation, wherein multiple fields across a database may be updated before such an update process may be considered complete. Application level semantics may hold off one or more applications from using invalid data in a fashion similar to individual cache lines, though bulk operations involve larger amounts of information. In one implementation, communicating the size of a bulk write operation may include a persistent direct memory access (DMA) command. In another implementation, communicating the size of a bulk write operation may include a mechanism to communicate the definition of a pool of memory. In yet another implementation, communicating the size of a bulk write operation may include a flag used at the time of dynamic memory allocation. In still another implementation, communicating the size of a bulk write operation may include signaling by the application. Application level coherence management for persistent memory may utilize in-process and/or committed states defined above as primitive commands for establishing application level memory coherence, for example.

Figure 5:
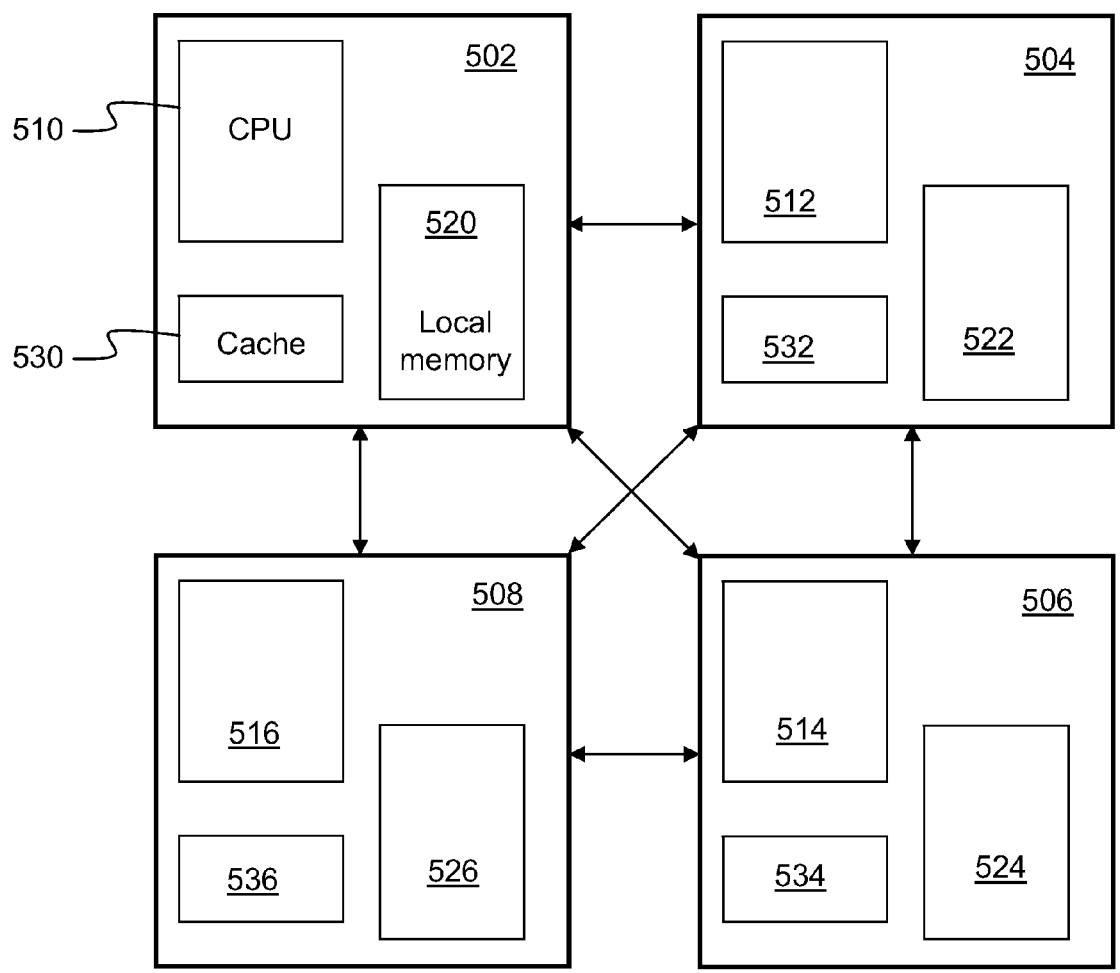
FIG. 5 is a schematic diagram of a multi-processor system configuration, according to another embodiment.

FIG. 5 is a schematic diagram of a multi-core system 500, according to an embodiment. Such a system may comprise processor nodes 502, 504, 506, and 508 connected to one another via one or more buses, for example. In one implementation, multi-core system 500 may comprise a shared memory multiprocessor. Individual processor nodes 502, 504, 506, and 508 may include processors 510, 512, 514, and 516, cache memories 530, 532, 534, and 536, and/or local memories 520, 522, 524, and 526, respectively. Within particular processor nodes, such local memories may comprise main memories associated with processors of the particular processor nodes. For example, local memory 520 may comprise a main memory associated with processor 510 in processor node 502. In an implementation, local memories may be shared, or accessed, by processors of other processor nodes. One or more local memories 520, 522, 524, and 526 may comprise all or at least a portion of persistent memory. In a particular implementation, a portion of local memory may comprise various types of memory, such as volatile DRAM. Portions of persistent memory need not be arranged contiguously in local memory, which may comprise one or more die structures, for example. Though not shown, processor units may include memory controllers that are integrated on a same die as processors or on separate dies, for example. Also, though FIG. 5 shows a system having four nodes, any number of nodes may be included and claimed subject matter is not limited to this particular arrangement.

Cache memories 530, 532, 534, and 536 may comprise high-speed memory for storing a copy of information obtained from any of local memories 520, 522, 524, and 526. Such cache memory may be searched using at least a portion of an address of individual local memories, for example. Such a portion of memory address used for searching cache memory is referred to as a cache index portion. For example, cache memory 530 may comprise a cache index portion and a cache data portion. The cache index portion may include line addresses of information stored in cache memory 530 and state information such as MESI state information and in-process and/or committed state information, as described above, for example. Of course, such details of a multi-core system are merely examples, and claimed subject matter is not so limited.

Figure 6:
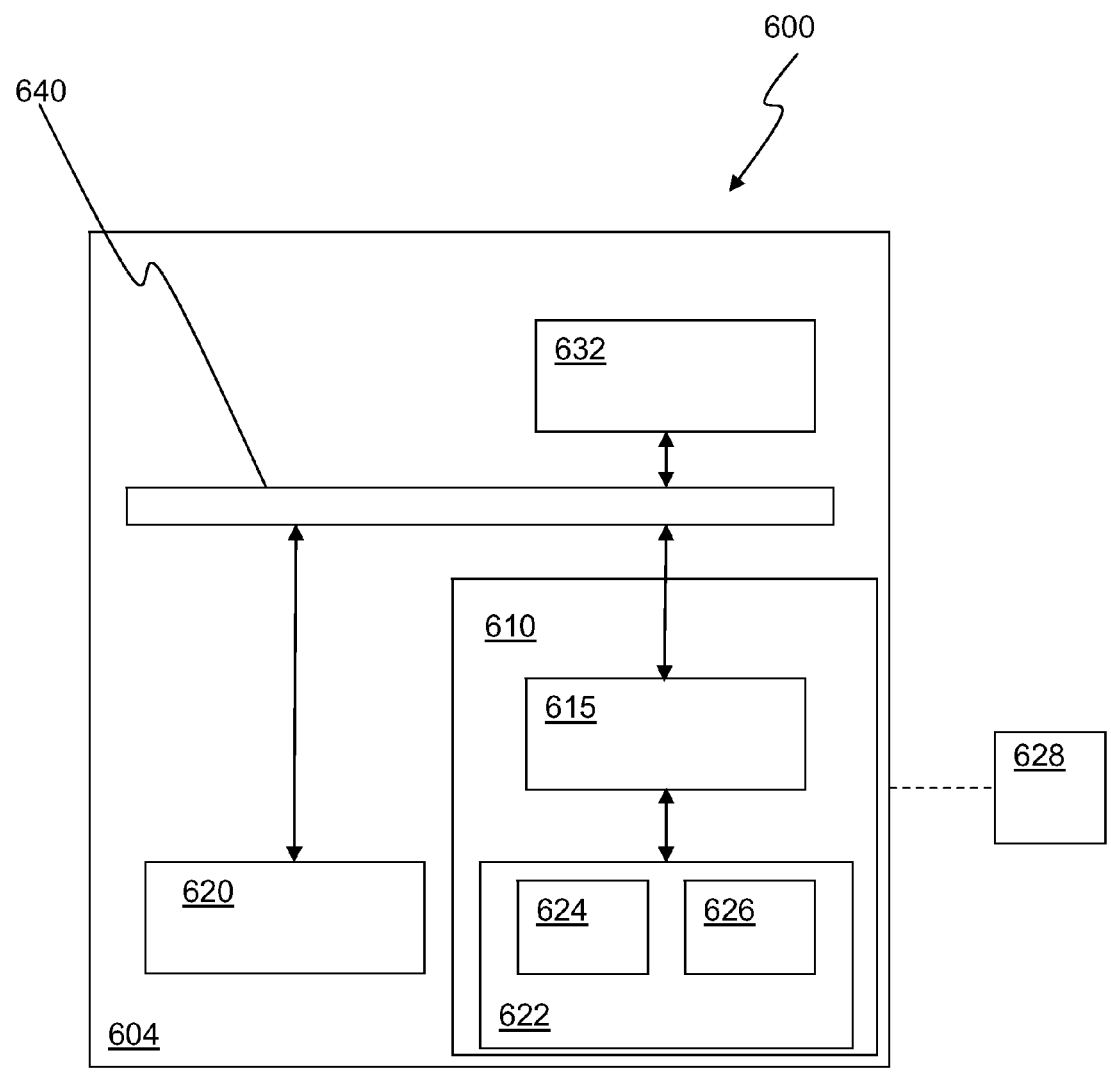
FIG. 6 is a schematic view of a computing system and a memory device, according to an embodiment.

FIG. 6 is a schematic diagram illustrating an exemplary embodiment of a computing system 600 including a memory device 610. A computing device 604 may be representative of any device, appliance, or machine that may be configurable to manage memory device 610. Memory device 610 may include a memory controller 615 and a memory 622. By way of example but not limitation, computing device 604 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

In an embodiment, computing device 604 may include multiple processing units represented by block 620. Such multiple processing units may be operatively coupled to memory 622 through a bus 640 and a host or memory controller 615. For example, through bus 640, multiple processing units 620 may share memory 622, which may comprise main memory. Processing unit 620 is representative of one or more circuits configurable to perform at least a portion of a data computing procedure or process. By way of example but not limitation, processing unit 620 may include multiple processors, controllers, microprocessors, microcontrollers, application specific integrated circuits, digital signal processors, programmable logic devices, field programmable gate arrays, and the like, or any combination thereof. Processing unit 620 may communicate with memory controller 615 to process memory-related operations, such as read, write, and/or erase, as well as memory partition processes discussed above, for example. Processing unit 620 may include an operating system adapted to communicate with memory controller 615. Such an operating system may, for example, generate commands to be sent to memory controller 615 over bus 640. Such commands may include read/write instructions, for example.

Memory 622 is representative of any data storage mechanism. Memory 622 may include, for example, a DRAM 624 and/or a persistent memory 626. In a particular embodiment, memory 622 may comprise a main memory that includes at least a portion of persistent memory, as described above. Memory 622 may also comprise cache memory that may likewise include at least a portion of persistent memory. While illustrated in this example as being separate from processing unit 620, it should be understood that all or part of DRAM 624 may be provided within or otherwise co-located/coupled with processing unit 620.

According to an embodiment, one or more portions of memory 622 may store signals representative of data and/or information as expressed by a particular state of memory 622. For example, an electronic signal representative of data and/or information may be "stored" in a portion of memory 622 by affecting or changing the state of such portions of memory 622 to represent data and/or information as binary information (e.g., ones and zeros). As such, in a particular implementation, such a change of state of the portion of memory to store a signal representative of data and/or information constitutes a transformation of memory 622 to a different state or thing.

Persistent memory 626 may include, for example, the same or similar type of memory as primary memory and/or one or more data storage devices or systems, such as, for example, PCM, a disk drive, an optical disc drive, a tape drive, a solid state memory drive, etc. In certain implementations, persistent memory 626 may be operatively receptive of, or otherwise configurable to couple to, a computer-readable medium 628. Computer-readable medium 628 may include, for example, any medium that can carry and/or make accessible data, code, and/or instructions for one or more of the devices in system 600.

In one embodiment, system 600 may comprise a memory controller 615 having at least a first interface to a main memory and at least a second interface to a processing entity (e.g., via bus 640 to processor 620), wherein the memory controller may be capable of enabling the processing entity to access the main memory according to a cache coherency protocol, and wherein at least a portion of said main memory comprises persistent memory. Such persistent memory may comprise PCM, for example. Computing device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A memory device comprising:
 a memory controller having at least a first interface to a main memory and at least a second interface to two or more processing entities, wherein said memory controller is configured to enable said processing entities to access said main memory according to a cache coherency protocol, the cache coherency protocol comprising an in-process state and a committed state;
 wherein the in-process state indicates that information in the main memory is being updated, and the memory controller is configured to:
 select between and perform actions of:
 a). waiting to load the information updated during the in-process state from the main memory to a cache until the committed state indicates that a memory update is complete and the cache may reload information from the main memory, or
 b). ignoring an update causing the in-process state and loading a previous cache content of the information;
 wherein at least a portion of said main memory comprises persistent memory; and
 wherein said memory controller is configured to enable a memory hierarchy including one or more levels of cache memory shared among said two or more processing entities, wherein at least a portion of said one or more levels of cache memory comprise persistent memory.

2. The memory device of claim 1, wherein said memory controller is further configured to enable a memory descriptor to identify said at least a portion of said main memory comprising persistent memory.

3. The memory device of claim 1, wherein said persistent memory comprises phase change memory (PCM).

4. The memory device of claim 1, wherein said persistent memory comprises a memory having asymmetrical read/write speeds.

5. The memory device of claim 1, wherein said two or more processing entities comprise a plurality of central processing units (CPUs).

6. The memory device of claim 1, wherein said main memory is entirely persistent memory.

7. The memory device of claim 1, wherein said processing entities access said persistent memory according to said cache coherency protocol.

8. A method comprising:
providing a memory device comprising a memory controller having at least a first interface to a main memory and at least a second interface to two or more processing entities; and
managing a cache coherency protocol comprising an in-process state and a committed state with the memory controller to allow the two or more processing entities to share the main memory-according to the cache coherency protocol;
wherein the in-process state indicates that information in the main memory is being updated, and the memory controller is configured to:
select between and perform actions of:
a). waiting to load the information updated during the in-process state from the main memory to a cache until the committed state indicates that a memory update is complete and the cache may reload information from the main memory, or
b). ignoring an update causing the in-process state and loading a previous cache content of the information;
wherein at least a portion of said main memory comprises persistent memory; and
wherein said memory controller is configured to enable a memory hierarchy including one or more levels of cache memory shared among said two or more processing entities, wherein at least a portion of said one or more levels of cache memory comprise persistent memory.

9. The method of claim 8, wherein said persistent memory comprises phase change memory (PCM).

10. The method of claim 8, wherein said persistent memory comprises a memory having asymmetrical read/write speeds.

11. The method of claim 8, wherein said cache coherency protocol is based, at least in part, on one or more latency properties of said persistent memory.

12. The method of claim 8, wherein said plurality of processing entities comprise one or more central processing units (CPUs).

13. A system comprising:
a plurality of processing entities; and
a memory device comprising:
a memory controller having at least a first interface to a main memory and at least a second interface to said plurality of processing entities, wherein said memory controller is configured to enable said plurality of processing entities to access said main memory according to a cache coherency protocol comprising an in-process state and a committed state;
wherein the in-process state indicates that information in the main memory is being updated, and the memory controller is configured to:
select between and perform actions of:
a). waiting to load the information updated during the in-process state from the main memory to a cache until the committed state indicates that a memory update is complete and the cache may reload information from the main memory, or
b). ignoring an update causing the in-process state and loading a previous cache content of the information;
wherein at least a portion of said main memory comprises persistent memory;
and wherein said memory controller is configured to enable a memory hierarchy including one or more levels of cache memory shared among said two or more processing entities, wherein at least a portion of said one or more levels of cache memory comprise persistent memory.

14. The system of claim 13, wherein said memory controller is further configured to signal to at least one of said plurality of processing entities to wait to access said main memory during said update process.

15. The system of claim 13, wherein said processing entity is configured to wait to access said main memory during said update process.

* * * * *